United States Patent
Truscello et al.

(10) Patent No.: US 6,176,375 B1
(45) Date of Patent: Jan. 23, 2001

(54) CONTAINER FOR FILLED FOOD PRODUCT

(75) Inventors: Franco Truscello, Alba; Giuseppe Terrasi, Benevello, both of (IT)

(73) Assignee: Soremartec S.A., Schoppach-Arlon (BE)

(*) Notice: Under 35 U.S.C. 154(b), the term of this patent shall be extended for 0 days.

(21) Appl. No.: 09/140,397

(22) Filed: Aug. 26, 1998

Related U.S. Application Data

(62) Division of application No. 08/786,454, filed on Jan. 21, 1997, now Pat. No. 5,858,428, which is a continuation of application No. 08/465,312, filed on Jun. 6, 1995, now abandoned.

(30) Foreign Application Priority Data

Nov. 18, 1994 (CH) .................................................. 3487/94

(51) Int. Cl.$^7$ .................................................. B65D 81/05

(52) U.S. Cl. ........................... 206/776; 206/521; 426/90; 426/106; 426/115

(58) Field of Search ..................................... 426/115, 119, 426/120, 139, 138, 95, 91, 90, 94, 130, 128, 282, 283, 279, 280, 390, 391, 103, 93, 106; 206/776, 521

(56) References Cited

U.S. PATENT DOCUMENTS

| | | |
|---|---|---|
| 1,794,238 | 2/1931 | McKibben . |
| 1,800,759 * | 4/1931 | Sheaf . |
| 1,810,453 * | 6/1931 | Webster et al. . |
| 2,111,021 * | 3/1938 | Bemiss . |
| 2,228,942 * | 1/1941 | Balton . |
| 2,759,826 * | 8/1956 | Lindsey . |

(List continued on next page.)

FOREIGN PATENT DOCUMENTS

| | | |
|---|---|---|
| 3711577 * | 10/1988 | (DE) . |
| 8805698 | 7/1989 | (DE) . |
| 4212306 * | 10/1993 | (DE) . |
| 219462 * | 4/1987 | (EP) . |
| 447733 | 9/1991 | (EP) . |
| 2164829 * | 8/1973 | (FR) . |
| 2437996 | 4/1980 | (FR) . |
| 2584683 * | 1/1987 | (FR) . |
| 2665692 * | 2/1992 | (FR) . |
| 2672575 * | 8/1992 | (FR) . |
| 347886 | 5/1931 | (GB) . |
| 920686 | 11/1959 | (GB) . |
| 1432968 | 4/1976 | (GB) . |
| 4-210549 * | 7/1992 | (JP) . |
| 5-192067 * | 8/1993 | (JP) . |

* cited by examiner

Primary Examiner—Steven Weinstein
(74) Attorney, Agent, or Firm—Rothwell, Figg, Ernst & Manbeck

(57) ABSTRACT

A container has a hollow base and a cap to store a filled food product having an edible shell with a peripheral flange. The base has a top member with an opening, a bottom member and an upstanding wall member that connects the top and bottom members. The opening In the top member and the upstanding wall member are dimensioned such that the shell is capable of being partially contained within and supported by the base while the flange of the shell is vertically spaced above the uppermost part of the base. The cap is connected to the base to enclose the filled food product. The cap is dimensioned and configured such that, when the filled food product is positioned in the base and the cap is connected to the base to enclose the food product, an upper portion of the cap is spaced from the top of the filled food product, a middle portion of the cap engages the flange and projects downwardly therefrom, and a lower portion of the cap closes the cap to the base such that the cap presses the filled food product to the base. The container thereby prevents movement of the filled food product relative to the base, while the flange is vertically spaced above the uppermost part of the base to enable the filled food product to be gripped by the flange for easy removal from the base.

3 Claims, 2 Drawing Sheets

U.S. PATENT DOCUMENTS

| | | | |
|---|---|---|---|
| 3,234,030 | * | 2/1966 | Knirim . |
| 3,331,691 | * | 7/1967 | Lindsey . |
| 3,381,873 | * | 5/1968 | Hirota . |
| 3,607,308 | * | 9/1971 | Dubble . |
| 3,620,403 | * | 11/1971 | Rump . |
| 3,637,404 | * | 1/1972 | Macmanus . |
| 3,645,758 | * | 2/1972 | Macmanus . |
| 3,865,953 | * | 2/1975 | Peters . |
| 3,874,548 | * | 4/1975 | Buff . |
| 4,002,773 | * | 1/1977 | Entenmann . |
| 4,069,996 | | 1/1978 | Koziol ................................. 248/146 |
| 4,205,091 | * | 5/1980 | Van Horne . |
| 4,226,355 | | 10/1980 | Helfrich, Jr. . |
| 4,430,351 | * | 2/1984 | Cilario . |
| 4,463,021 | * | 7/1984 | Eufemia . |
| 4,472,440 | * | 9/1984 | Bank . |
| 4,765,998 | * | 8/1988 | Pak et al. . |
| 4,812,323 | * | 3/1989 | Savage . |
| 4,842,143 | * | 6/1989 | Mekee et al. . |
| 4,874,618 | * | 10/1989 | Seaborn et al. . |
| 4,919,946 | * | 4/1990 | Pak et al. . |
| 4,947,993 | * | 8/1990 | Bruml et al. . |
| 5,002,783 | | 3/1991 | Ruiz ..................................... 426/138 |
| 5,045,333 | * | 9/1991 | Petrofsky et al. . |
| 5,076,435 | * | 12/1991 | Drews . |
| 5,082,677 | * | 1/1992 | Bear . |
| 5,162,126 | * | 11/1992 | Thorner et al. . |
| 5,613,605 | * | 3/1997 | Angeles et al. . |

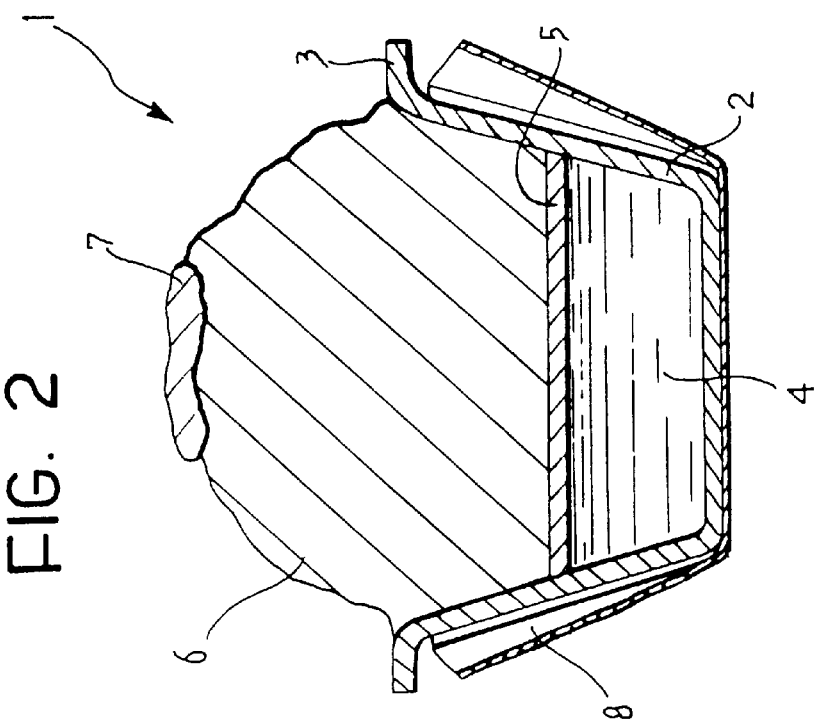
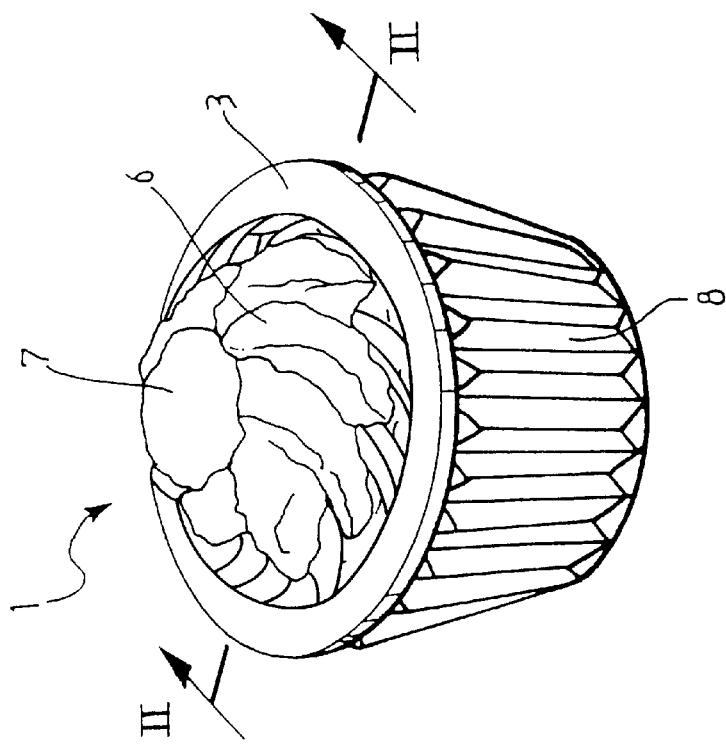

CONTAINER FOR FILLED FOOD PRODUCT

CROSS-REFERENCE TO RELATED APPLICATIONS

This application is a division of Ser. No. 08/786,454, filed Jan. 21, 1997 now U.S. Pat. No. 5,858,428, which is a continuation of Ser. No. 08/465,312 filed Jun. 6, 1995, now abandoned.

DESCRIPTION

1. Field of the Invention

The present invention relates to a food product and a food product-packing unit which provides for protectively packing a product and preventing smearing of the product during removal of the product from its package

2. Description of Related Art

A wide variety of products of the type specified above is known in the art. T his is true particularly as regards the shell-type containment layer which, especially in mass-produced confectionery, is typically a half-shell or cup made of wafer or the like (see, for example, the document U.S. Pat. No. 4,430,351) or, for example, in small bakeries, is often a pastry container and which is filled with a quantity of filling: this applies to all small-bakery products commonly known as "cup-cakes".

Over the last few years there has been a growing trend in the food industry, especially in the field of confectionery, towards the manufacture of products which are very similar to traditional bakery products, both in their appearance and in the way they are presented to the consumer. At the same time, however, this trend must take into account the fact that, unlike traditional bakery products which are intended to be eaten soon after they are made, and usually locally, industrial products must be transported (sometimes far from the place of production) and/or must be kept and displayed in conditions which will not spoil their appearance and appeal to the consumer. One may consider, for example, to products which include a creamy decoration (such as a twirl of cream on top, such as chantilly cream or the like); in products of this type which are to be mass-produced and mass-marketed, any decoration smeared on the packaging will certainly prove off-putting. A tendency to smear the consumer's hands as he grasps the product is another negative phenomenon which producers endeavour to avoid. This is all the more important since, unlike traditional cakes (generally intended to be served and eaten at a table, for example to finish off a meal) mass-produced confectionery is often served and eaten in conditions (in bars and other social meeting places and in vehicles, for example) where consumers object strongly to getting their hands soiled.

SUMMARY OF THE INVENTION

The object of the present invention is to provide a solution to the problems described above.

This object is achieved according to the present invention by a food product having the characteristics selected to cooperate with a package to protect a food product in transit and wherein the food product is shaped to enhance the user's ability to cleanly remove a product from its package on the package is opened.

The invention also relates to packaging for such a product. The packaging according to the invention has the characteristics providing open space for surrounding filling or decoration in the product, means for retaining the product in transit, and means providing for lifting the product after the package is opened.

BRIEF DESCRIPTION OF THE DRAWINGS

The invention will now be described, purely by way of non-limitative example, with reference to the appended drawings, in which:

FIG. 1 is a perspective view of a food product of the invention;

FIG. 2 is a section taken on the line II—II of FIG. 1;

DESCRIPTION OF THE PREFERRED EMBODIMENTS

Figure 3:
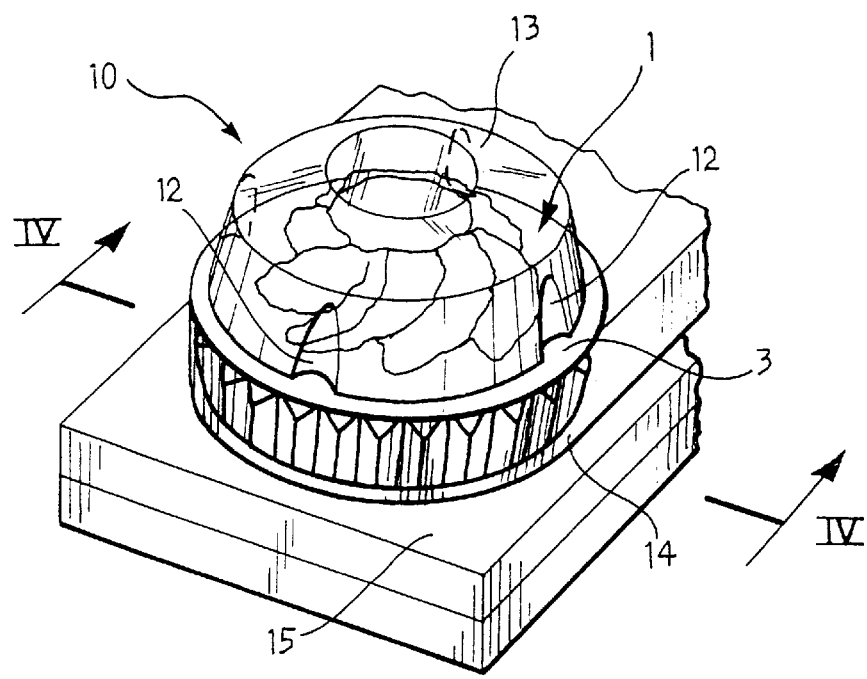
FIG. 3 shows packaging for the product of FIGS. 1 and 2.

In the drawings, a food product, generally indicated 1, is illustrated, purely by way of non-limitative example, as a confectionery product such as a cake.

The product (see FIG. 2 in particular) includes a shell-type containment layer 2, constituted in the embodiment illustrated by a cup of edible material such as chocolate (or a like product) or wafer, for example.

According to a characteristic which will be described in greater detail later, the shell 2 has an annular flange 3 around its top opening which projects radially outwardly therefrom by a certain distance (for example 2 or 3 mm).

The criteria for the manufacture of shell-like containers with an internal flange 3 from a single edible material are widely known in the art and do not need to be described herein.

If, for instance, it is decided to make the shell 2 out of chocolate, it is possible to use the moulding technique (often called "slush moulding") which is currently used in the manufacture of the half shells of Easter eggs or the hollow hemispherical half-shells of pralines to be filled with liqueur or a creamy filling. Naturally, the above is true even if the shell 2 is made of another edible material such as wafer or the like.

As to the implication that the flange 3 is annular, it should be pointed out that the description should in no way be seen as restricted to a continuous circular development as shown—by way of example—in the appended drawings. The annular flange 3 may have a polygonal or more complicated outline and/or may have other discontinuities such as notches or pleats and the like without any effect on the performance of the flange 3 in the terms which will be explained in greater detail below.

With reference once again to the embodiment illustrated in the appended drawings, it is intended that a syrup 4, flavoured for example with coffee, hazelnut, orange or the like, be poured into the bottom of the shell 2 of the product 1 shown here, this then being closed by a lid or seal 5 formed by pouring on a molten mass of chocolate, sugar or the like.

A quantity of creamy filling or topping 6, of lighter or denser consistency, is deposited inside the shell 2 on top of the barrier or vane formed by the lid or seal 5 and may project above the edge formed by the flange 3 to form a decorative twirl. This decoration will be more or less solid according to the solidity of the filling material 6 (which may, for example, harden once it is on the product) and may be further embellished by the placing, on top of the twirl, of an additional decorative element 7 constituted, for example, by a coffee bean or a piece of dried or candied fruit or the like. It is clear that, in any case, the embodiment illustrated is purely an example and should not be seen in any way as limiting the scope of the invention.

As mentioned earlier, a main characteristic of the product of the invention consists in the presence of the annular rim or flange 3 which projects outwardly of the product itself and, particularly of the decorative twirl 6 and even of the case 8 which typically is constituted by a frusto-conical container of card (or another laminar material) with a pleated peripheral wall enclosing the outer surface of the shell 2.

As may better be seen from the cross-sectional view of FIG. 2, the flange 3 enables the consumer to take hold of the product, for instance to remove it from its case 8, without touching the filling 6 (especially the decorative twirl) and, in any case, minimises the surface area of the product contacted during consumption. In practice, the consumer takes the product 1 by gripping two diametrally opposite portions of the radially outer surface of the flange 3 between a finger and thumb.

Figure 4:
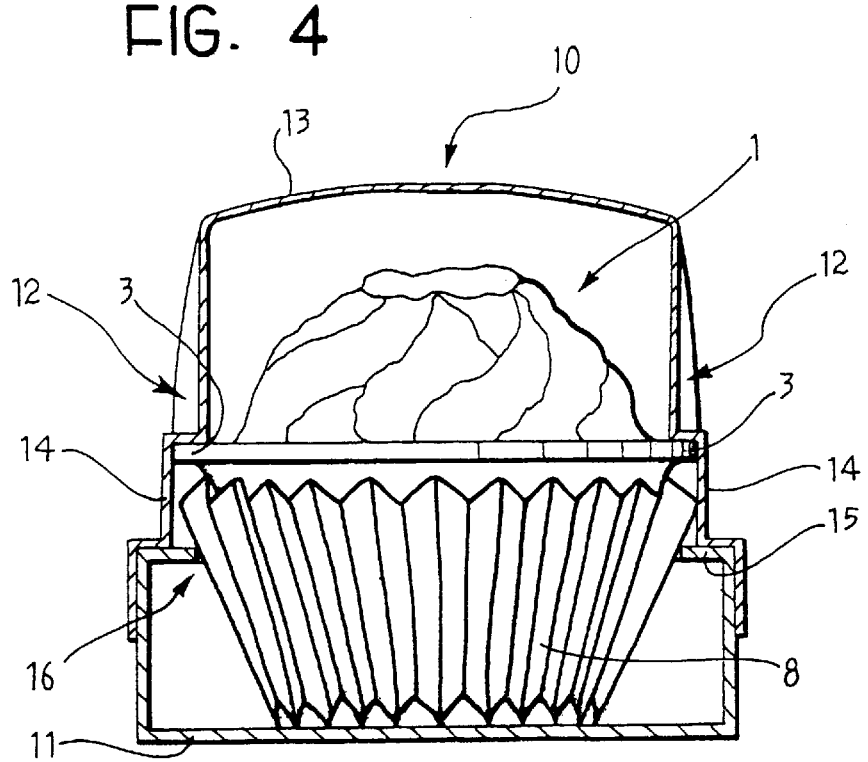
FIG. 4 is a section taken on the line IV—IV of FIG. 3.

FIGS. 3 and 4 illustrate the role played by the flange 3 during the packaging, transport and display of the product 1 in its packaging, generally indicated 10.

It should be pointed out in this context that FIGS. 3 and 4 give an overall view of a single packaging unit, that is, a packaging element designed to hold one product, such as the product 1 illustrated in FIGS. 1 and 2. The structure of the unit illustrated in FIGS. 3 and 4 is, however suitable for production in a modular form so as to provide packaging which can contain any number n of products such as the product 1 of FIGS. 1 and 2.

It is possible, for example, to imagine putting together several units such as the unit 10 shown in FIGS. 3 and 4 so as to form a multipack for containing a line of products 1. The repetition of this arrangement in two dimensions can provide multipacks with matrices which can contain a plurality of products in an array comprising a given number of rows and a given number of lines. The rows or lines may be staggered longitudinally so as make the arrangement more attractive. In any case, all these possible developments preserve the basic characteristic illustrated with regard to the single unit 10 of FIGS. 3 and 4, that is, the joint provision of:

a support or bearing surface for the product 1, which surface is constituted, in the embodiment illustrated, by a base 11 of the individual unit on which the bottom of the case 8 containing the product 1 rests, and one or more retaining formations 12 which can cooperate with the annular flange 3 in such a way that the product 1 is held in the package la between the bearing or support surface 11 and the retaining formations 12.

In the embodiment illustrated, the retaining formations 12 are constituted by profiled portions (nail-shaped indentations) which project radially inwardly from a protective cap 13 of transparent material above the position of the flange 3. This cap 13 covers the decorative twirl 6 which projects above the flange 3 but is spaced from it and thus does not contact the product 1. The cap 13 is connected to the base 11 by a tubular extension 14 which rests on, and at least partly surrounds, the top 15 of the container (constituted in the example illustrated by a cardboard box), of which the base 11 is a part. The top 15 has an opening 16, which is circular in the embodiment illustrated, for receiving the shell 2 of the product 1 in its case 8.

Naturally, the principle of the invention remaining unchanged, manufacturing details and embodiments may be varied widely from those described and illustrated without departing from the scope of the present invention. This applies to various aspects of the arrangement illustrated by way of example in the appended drawings.

A first variant may concern, for example, the shape of the bearing or support base 11. It may easily be seen from FIG. 4 that the product 1 may be retained correctly inside the packaging 10 even if the bottom of the shell 2 (and of the case 8 containing it) does not rest on the base 11. At least in principle, the product could be held by resting the peripheral surface of the product 1 on the peripheral edge of the opening 16 in the top 15 and by holding the product 1 in this position by means of the retaining formations 12 in the cap 13 which cooperate with the flange 3.

In the embodiment illustrated in the appended drawings, the cap 13 is made of a transparent material through which the product 1 may be viewed. This cap need not, of course, be transparent and could be replaced by a nontransparent protective cover.

With regard to the retaining formations 12, the use of nail-shaped formations which project inwardly from the base of the cap 13 is currently preferred for reasons of simplicity but is not imperative. Substantially similar support by the flange 3 could be achieved, for example, by an annular projection formed at the base of the cap 13 so as to bear on the annular flange 3. It will readily be understood from the above that the arrangement illustrated by way of example in the appended drawings (continuous flange and discontinuous retaining formations 12, constituted by indentations equally spaced around the periphery of the base of the cap 13) could be reversed by providing a continuous annular retaining formation, as suggested above, and making the flange 3 discontinuous.

What is claimed is:

1. A container for maintaining the appearance of a filled food product and for preventing smearing of a consumer's hand upon removal of the filled food product from said container, said filled food product comprising an edible shell having a bottom portion, an upstanding wall portion and an open top for receiving a filling and an edible filling contained in said shell, said shell having a peripheral flange projecting outwardly from said upstanding wall portion sufficient to provide a gripping means to enable a consumer to lift said filled food product by taking hold of sad flange; said container comprising a hollow base and a cap, said base comprising a top member, a bottom member, an upstanding wall member connecting said top and bottom member and an opening in the top member of the base, said opening in the top member of the base and said upstanding wall member being dimensioned such that said edible shell is capable of being partially contained within and supported by said base while said flange of said shell is vertically spaced above the uppermost part of said bas, said cap being connected to said base to enclose said filled food product; said cap comprising an upper portion, a middle portion and a lower portion, said cap being dimensioned and configured such that in its connected position and when the filled food product is positioned in the container, the upper portion is spaced from both the top of the edible shell and any portion of said filling which may project above said shell, the middle portion engages said flange and projects downwardly therefrom and the lower portion closes said cap to said base such that said cap presses said filled food product to said base and prevents movement of said filled food product relative to said base, said flange being vertically spaced above the uppermost part of said base sufficient to enable the filled food product to be gripped by said flange and removed from the base.

2. A container according to claim 1, wherein said cap is made from transparent material.

3. A container according to claim 1, wherein said base comprises a box.

* * * * *